US012590490B2

(12) United States Patent
Schlögl

(10) Patent No.: US 12,590,490 B2
(45) Date of Patent: Mar. 31, 2026

(54) VACUUM INSULATED GLASS AND METHOD OF MAKING SAME

(71) Applicant: sedak GmbH & Co. KG, Gersthofen (DE)

(72) Inventor: Fritz Schlögl, Stadtbergen (DE)

(73) Assignee: SEDAK GMBH & CO. KG, Gersthofen (DE)

( * ) Notice: Subject to any disclaimer, the term of this patent is extended or adjusted under 35 U.S.C. 154(b) by 193 days.

(21) Appl. No.: 18/204,852

(22) Filed: Jun. 1, 2023

(65) Prior Publication Data

US 2023/0392434 A1 Dec. 7, 2023

(30) Foreign Application Priority Data

Jun. 2, 2022 (DE) .......................... 102022113990.5

(51) Int. Cl.
| | |
|---|---|
| *E06B 3/677* | (2006.01) |
| *C03C 27/10* | (2006.01) |
| *E06B 3/66* | (2006.01) |
| *E06B 3/663* | (2006.01) |
| *E06B 3/673* | (2006.01) |

(52) U.S. Cl.
CPC ............ *E06B 3/6736* (2013.01); *C03C 27/10* (2013.01); *E06B 3/6612* (2013.01); *E06B 3/66328* (2013.01); *E06B 3/67304* (2013.01); *E06B 3/67321* (2013.01); *E06B 3/67356* (2013.01); *E06B 3/6775* (2013.01)

(58) Field of Classification Search
CPC .................................................. E06B 3/6612
See application file for complete search history.

(56) References Cited

U.S. PATENT DOCUMENTS

| | | | |
|---|---|---|---|
| 5,091,258 A * | 2/1992 | Moran | .............. B32B 17/10174 |
| | | | 428/524 |
| 2020/0347666 A1 | 11/2020 | Kim | |
| 2022/0152993 A1* | 5/2022 | Hasegawa | ............. E06B 3/6612 |

(Continued)

FOREIGN PATENT DOCUMENTS

| | | |
|---|---|---|
| CN | 1246450 | 3/2000 |
| CN | 1246450 A | 3/2000 |
| CN | 104973807 A | 10/2015 |

(Continued)

OTHER PUBLICATIONS

German Office Action for German Patent Application File No. 102022113990.5, issued on Nov. 14, 2022, 8 pages.

(Continued)

*Primary Examiner* — Jeffry H Aftergut
(74) *Attorney, Agent, or Firm* — Clark Hill PLC

(57) ABSTRACT

The present invention relates to a method for manufacturing vacuum insulating glass, the method involving applying a vacuum sealant to a first surface of a first glass sheet, the vacuum sealant including a plastic film having a preferably rough surface, placing a second glass sheet on the vacuum sealant such that a cavity is formed between the first and second glass sheets and the vacuum sealant, applying a vacuum to an outer surface of the vacuum sealant until a vacuum is formed in the cavity, wherein the first and second glass sheets are placed in a vacuum bag to apply the vacuum, and heating the vacuum sealant while the first and second glass sheets are in the vacuum bag.

14 Claims, 2 Drawing Sheets

(56)        References Cited

U.S. PATENT DOCUMENTS

2023/0151674 A1 *   5/2023   Hasegawa ............. E06B 3/6775
                                                        156/103

FOREIGN PATENT DOCUMENTS

| CN | 106522768 | A | | 3/2017 |
| DE | 102012104360 | | | 11/2013 |
| GB | 2385086 | | | 8/2003 |
| JP | 2006062344 | A | | 3/2006 |
| WO | WO-2013/162463 | A1 | * | 10/2013 |

OTHER PUBLICATIONS

First Examination Report issued for EP Application No. 23176344.2
issued on Mar. 13, 2024 (5 pages).

* cited by examiner

100

200

A-A

VACUUM INSULATED GLASS AND METHOD OF MAKING SAME

CROSS-REFERENCE TO RELATED APPLICATIONS

This application claims priority to German Patent Application 10 2022 113 990.5 filed Jun. 2, 2022, the entirety of which is incorporated herein by reference and made a part of the present application.

FIELD OF THE INVENTION

The present invention relates to vacuum insulated glass and a method of making vacuum insulated glass, in particular for building envelopes and windows.

BACKGROUND OF THE INVENTION

Vacuum insulated glass is a stand-alone alternative to gas-filled double or triple glazing. Like conventional gas-filled double or triple glazing, vacuum insulated glass is used to increase thermal insulation and sound insulation properties of buildings. Therefore, they are an important factor in the comfort of the occupant of a building, especially compared to glass units with weak insulation created, for example, by ordinary single glazing.

Conventional insulated glass panels are formed by two or more glass panes, which are kept at a distance from each other by spacers placed at the edges. The spacer is usually a metal profile glued to the edges of the panes. A sealed cavity formed between the glass panes and bounded by the edge spacers is filled with a dry gas, such as dry air or even inert gases, in the case of insulating glass.

Vacuum insulated glass panels have a very similar structure. Here, too, a cavity is defined between two or more panes of glass. For the purposes of the present application the terms "sheet" and "pane" are interchangeable. Unlike the conventional insulated glass panels described above, however, the cavity in vacuum insulated glasses is not filled with air or inert gases. Rather, there is an airless space between the glass panes (i.e., a vacuum), which prevents heat transfer and convection in the vacuum insulated glass. Accordingly, the vacuum insulated glass has a very low energy transmittance with a very thin structure. Even thin vacuum cavities can effectively prevent unwanted heat transfer.

Vacuum insulated glass panels are currently offered by various manufacturers in small to medium quantities. For this purpose, two glass panes or surface elements are printed with a solderable strip as an edge frame and heated. Small metallic spacers are then placed, which serve as local supports in the cavity between the two glass panes. The two glass sheets prepared in this way are then soldered together along the solderable strips. The soldering process takes place in a furnace heated to over 400° C., in which the glass panes/sheets are joined after the soldering surfaces have been pretreated. One of the two glass panes/sheets has a hole, which is provided with a valve. A vacuum is drawn at this valve after the two glass sheets have been soldered together, and the valve is closed with solder.

The manufacturing process for vacuum insulated glass described above is very complex, which means that vacuum insulated glass is still very expensive. It can only be used for vacuum insulated glass with simple glass panes, because laminated glass cannot withstand temperatures of over 400° C. used in the soldering process. This is particularly the case because the laminated film, which is placed between the glass panes in safety glass, cannot withstand such high temperatures. Lamination after the vacuum has been created would in turn lead to glass breakage in the vacuum insulated glass, since the usual pressure of about 12 bar (1200 kPa) would put too much strain on the vacuum insulated glass. Finally, the sizes of vacuum insulated glass that can be produced using the process known in the art are very limited and are currently no larger than 2.4 to 3 m.

SUMMARY OF THE INVENTION

To address the problems associated with the prior art discussed above, it is an object of the present invention to provide a process for manufacturing vacuum insulated glass, which involves less manufacturing effort and, at the same time, does not impose any restrictions with regard to the sizes that can be produced. Another object of the present invention is to produce vacuum insulated glass as a safety glass.

Accordingly, the present invention relates to a method of manufacturing vacuum insulated glass. The method includes the steps of applying a vacuum sealant to a first surface of a first glass sheet, the vacuum sealant preferably comprising a plastic film having a rough surface. A second glass sheet is placed on the vacuum sealant such that a cavity is formed between the first and second glass sheets and the vacuum sealant. A vacuum is applied to an outer surface of the vacuum sealant until a vacuum is established in the cavity, such that the first and second glass sheets are placed in a vacuum bag to apply the vacuum. Additionally, the vacuum sealant is heated while the first and second glass sheets are in the vacuum bag.

The present invention also relates to a vacuum insulated glass that includes a first and a second pane of glass and a vacuum sealant which is arranged between the first and second glass sheets, in particular on the edge side, so that a cavity is formed between the first and second glass sheets and the vacuum sealant. According to another embodiment, the vacuum sealant comprises a polyvinyl butyral film. According to a further embodiment, the vacuum insulated glass has a barrier, in particular a barrier made of silicone, which is arranged between the cavity and the vacuum sealant. According to a further embodiment, the vacuum insulated glass has spacers made of plastic, preferably transparent plastic, which are arranged in a distribution in the cavity. According to a further embodiment, the spacers preferably have a diameter of from 3 mm to 12 mm, preferably from 7 to 10 mm. The spacers may have a height of 0.5 mm to 3 mm, preferably 1 mm to 2 mm.

According to another embodiment, the present invention relates to a method of manufacturing vacuum insulation elements, which method entails applying a vacuum sealant to a first surface of a first sheet member, the vacuum sealant including a plastic film having a preferably rough surface. A second sheet member is placed member on the vacuum sealant such that a cavity is formed between the first and second sheet members and the vacuum sealant. Further, a vacuum is applied to an outside surface of the vacuum sealant until a vacuum is established in the cavity. The vacuum sealant can then be heated.

BRIEF DESCRIPTION OF THE DRAWINGS

For a better understanding of the present invention, reference is made to the following detailed description of various exemplary embodiments considered in conjunction with the accompanying drawings, in which.

DETAILED DESCRIPTION OF VARIOUS EXEMPLARY EMBODIMENTS

Figure 1:
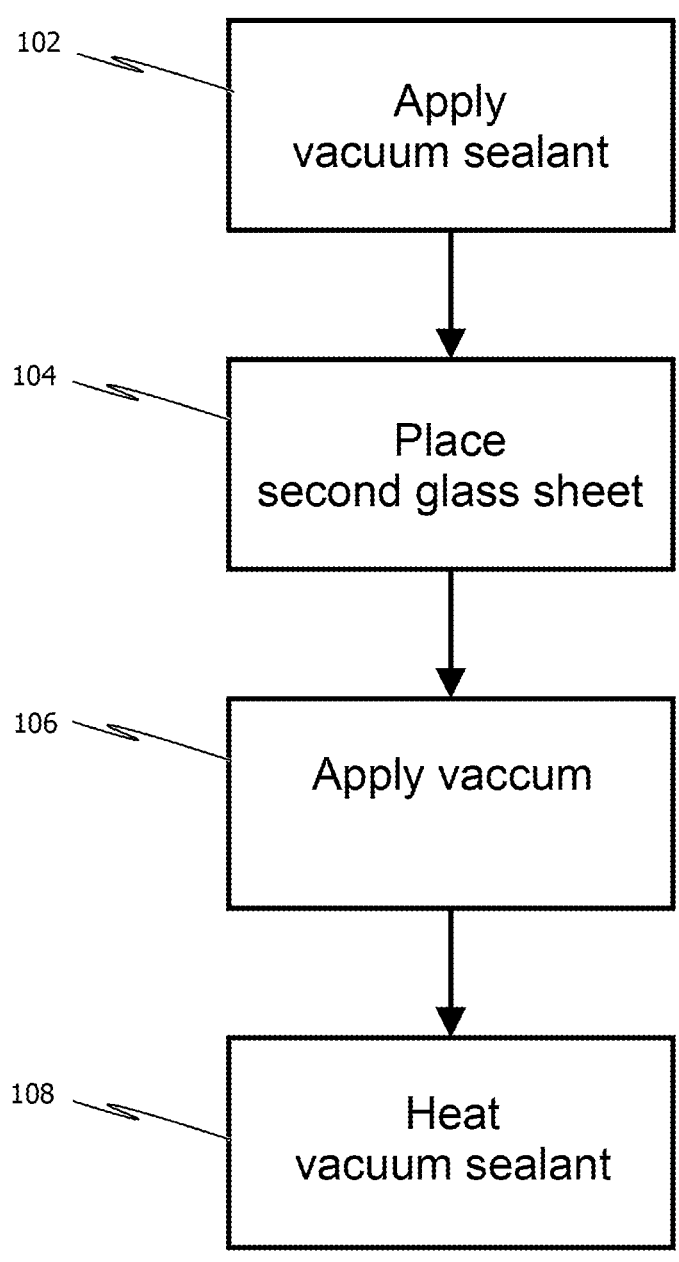
FIG. 1 is a schematic flow diagram of an embodiment of the method according to the present invention.

Reference will now be made to the various embodiments of the present invention illustrated in FIGS. 1-3. Whenever specified hereinbelow, similar or like reference numbers (increased by, for example, one hundred, two hundred, etc.) may be used in the figures to indicate similar or like structure and/or functionality. It should be understood that the figures depict the various embodiments of the present invention for purposes of illustration only, with the further understanding that some illustrated features are depicted schematically due, for instance, to scaling constraints. One skilled in the art will readily recognize from the following description that alternative embodiments of the structures and methods illustrated in FIGS. 1-3 may be employed, without departing from the objects of the invention described hereinabove.

All terms defined herein should be afforded their broadest possible interpretation, including any implied meanings as dictated by a reading of this specification, as well as any words that a person having skill in the art and/or a dictionary, treatise, or similar authority would assign thereto. For instance, the terms, "for example", "e.g.", "optionally", as used herein, are intended to be used to introduce non-limiting examples, while the phrases "in one embodiment" and "in some embodiments" as used herein do not necessarily refer to the same embodiment(s), although they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Throughout the specification, the meaning of "a," "an," and "the" includes plural references. The terms "comprises" and "comprising" when used herein specify that certain features are present in that embodiment; however, this phrase should not be interpreted to preclude the presence or inclusion of additional steps, operations, features, components, and/or groups thereof.

Accordingly, the invention relates to a method of manufacturing vacuum insulated glass, the method comprising:

Applying a vacuum sealant to a first surface of a first glass sheet, the vacuum sealant preferably comprising a plastic film having a rough surface;

placing a second glass sheet on the vacuum sealant such that a cavity is formed between the first and second glass sheets and the vacuum sealant;

applying a vacuum to an outer surface of the vacuum sealant until a vacuum is established in the cavity, wherein the first and second glass sheets are placed in a vacuum bag to apply the vacuum;

heating of the vacuum sealant while the first and second glass sheets are in the vacuum bag.

According to the novel process, the edges of the glass panes of the vacuum insulated glass are not soldered, but rather joined together by a plastic film, for example a laminated film, such as is also used in the lamination process of safety glass. This plastic film is arranged along the edges between the two glass panes so that a cavity is formed between the plastic film and the glass panes. Accordingly, the plastic film is preferably arranged along the entire edge of the glass panes.

In its original state (i.e., when the plastic film has not yet been heated), the plastic film is still permeable to air. In other words, air exchange is still possible between the cavity defined by the plastic film and the glass panes and the outside before the plastic film is heated. Thus, when applied to the glass panes, prior to heating, the plastic film does not yet create a hermetic bond with the glass panes. This is particularly so if a plastic film with a certain roughness is applied, whereby gaps exist between the glass panes and the plastic film due to said roughness. It can therefore be advantageous to use plastic films with a surface roughness of 1 μm to 10 μm. Because the plastic film is not hermetically sealed, air or other gases can be removed (drawn) from the cavity between the glass panes without having to provide an opening in the glass panes. Rather, the air is then drawn out of the cavity via the plastic film. A vacuum pump on the outside of the glass panes can be used for this purpose, for example. In particular, the glass sheets are placed in a vacuum bag for this purpose.

As soon as a vacuum has been achieved between the glass panes, the vacuum sealant, which is in the form of a plastic film, is heated. During heating, the glass panes are still in a vacuum bag. The vacuum sealant is heated until it has bonded to the glass panes along the edge without any gaps and forms a hermetic seal for the cavity. While the vacuum sealant is being heated, the vacuum pump preferably continues to operate to prevent air or gases from entering the cavity until the hermetic seal has been formed.

The use of a plastic film as a vacuum sealant allows air to be extracted from the cavity via the vacuum sealant itself, so that no further openings are required on the glass panes. Moreover, the temperatures used to fuse the vacuum sealant formed as a plastic film can be far lower than known soldering temperatures, so that vacuum insulated glasses made of laminated safety glass can also be produced without introducing inadvertent internal stress.

By using a vacuum bag, it is possible to simultaneously draw a vacuum between the glass sheets and apply pressure to the glass sheets from the outside (i.e., outside the vacuum bag). In other words, the vacuum bag can be pressurized on its outer surface, while a vacuum is applied on the inside. The compressed air can be used simultaneously to heat the vacuum sealant. Such a provision of vacuum, heat and pressure is only possible through the use of a vacuum bag. The use of a vacuum heating chamber alone cannot guarantee positive pressure, so that the vacuum sealant may only have an inadequate seal.

In particular, the vacuum bag completely surrounds the two glass panes. The vacuum bag is then connected to a vacuum pump so that a vacuum is created in the interior of the vacuum bag, which accordingly also evacuates the air present in the cavity between the glass panes. The use of a vacuum bag allows the vacuum sealant to be fused under pressure without introducing new air into the cavity.

Finally, the novel process can produce a fully transparent vacuum insulated glass. This is particularly the case because the plastic film, for example a laminating film, is transparent at least after heating and can thus only be seen along the edge seal of the vacuum insulated glass by an expert observer. The new process can also be used to produce much larger vacuum insulated glasses, for example up to 20 m×3.6 m.

According to a further embodiment, the vacuum sealant comprises a polyvinyl butyral film. It has been found that the use of a plastic film made of polyvinyl butyral is particularly advantageous, since it has a natural roughness that facilitates drawing the vacuum over the vacuum sealant. Polyvinyl butyral is also comparatively easy to process, so that the pressures and temperatures used do not have to be too high.

According to a further embodiment, the process has a step for applying a barrier prior to placing the second glass pane, the barrier being arranged between the cavity and the vacuum sealant. The barrier serves to prevent the vacuum sealant, which is in the form of a plastic film, from penetrating beyond the edge region of the glass panes into the cavity during heating. Rather, the barrier ensures that the vacuum sealant remains in a precisely defined edge area of the glass panes. The barrier also helps to maintain the vacuum in the cavity (i.e., to prevent air exchange with the outside).

According to a further embodiment, the barrier may comprise silicone, in particular transparent silicone. Accordingly, plastics are also used for the barrier which have similar temperature properties to the plastic film of the vacuum sealant. Furthermore, the use of transparent silicone ensures that the novel vacuum insulated glass is fully transparent. After the manufacturing process, the barrier made of transparent silicone is only visible to the trained eye.

According to a further embodiment, the barrier has at least two mitered sections which are arranged next to each other on the first surface of the first glass sheet in such a way that a miter joint is formed in the abutting area. In the case of rectangular glass sheets, for example, the barrier may have four sections, each of which is mitered at its two opposite ends. These are then joined together to form a frame, as is usually the case, for example, with the profile sections of window frames. In one such example, the barrier has a miter joint at each corner of the rectangular glass panels. The miter joint has the advantage of serving as a channel for evacuating air in the cavity during the manufacturing process. In alternative embodiments, the barrier has two sections which are arranged adjacent to each other in such a way that a butt edge is formed. This need not be a mitered joint to serve as a vacuum channel, as described above with reference to mitered joints. Rather, it can also be perpendicular butt joints between adjacent sections of the barrier. In particular, when acrylic strips are used, they may be spaced 0.5 mm to 2 mm, preferably 1 mm, apart at their (perpendicular) butt edges to provide an air channel for evacuating air in the cavity. Due to the pressure and heat in the manufacturing process, the gaps between adjacent acrylic strips are closed, creating an essentially one-piece barrier of acrylic.

According to a further embodiment, the first and second glass sheets are placed in an autoclave for heating the vacuum sealant. In the autoclave, an overpressure as well as the required temperatures for fusing the vacuum sealant can be achieved simultaneously. In particular, the two glass sheets can be introduced into the autoclave in a vacuum bag, while a vacuum pump is arranged outside the autoclave and connected to the vacuum bag.

According to a further embodiment, a pressure of 0.5 bar to 3 bar (50 kPa to 300 kPa), preferably 1 bar to 2 bar (100 kPa to 200 kPa), is applied during heating of the first and second glass sheets. Such pressure conditions result in a particularly reliable sealing of the cavity by the vacuum sealant. Furthermore, according to a further embodiment, it is advantageous to heat the vacuum sealant to between 100° C. and 150° C., preferably between 125° C. and 135° C.

According to another embodiment of the present invention, spacers are distributed on the first surface of the first glass pane before the second glass pane is placed thereon such that the spacers are arranged in the cavity after the second glass pane is placed thereon. The spacers serve to determine the distance between the two glass panes and thus the volume of the cavity. The spacers also prevent the glass sheets from bending due to the pressure applied during the manufacturing process.

For example, the spacers may be made of transparent plastic to provide a fully transparent vacuum insulated glass. In an alternative embodiment, the spacers are made non-transparent (e.g., gray or black) to form the vacuum insulated glass as a bird protection glass. The non-transparent spacers can then be spaced, for example, in such a regular or irregular manner as to produce a pattern that is visible from the outside.

According to a further embodiment, the spacers have a diameter of from 3 mm to 12 mm, preferably from 7 to 10 mm. The spacers can have a height of 0.5 mm to 3 mm, preferably 1 mm to 2 mm.

According to another embodiment, the method comprises a step of applying an edge cover to edges of the first and second glass sheets, prior to heating the vacuum sealant. In other words, the glass sheets may be wrapped with an edge cover. This edge cover may be, for example, a metal foil covering the gap between the two glass sheets so that the vacuum sealant cannot leak out of the gap between the glass sheets during heating. According to an advantageous embodiment, the vacuum sealant is accordingly placed between the edge cover and an internal silicone barrier, so that a precisely defined area (space) for the vacuum sealant can be defined by these two parts.

According to a further embodiment, the first and/or the second glass pane may be provided with further coatings, such as thermal protective coatings or solar control coatings, on the first and/or the second surface.

According to another aspect, the present invention relates to a vacuum insulated glass comprising:
  a first and a second pane of glass;
  a vacuum sealant which is arranged between the first and second glass sheets, in particular on the edge side, so that a cavity is formed between the first and second glass sheets and the vacuum sealant.

According to another embodiment, the vacuum sealant comprises a polyvinyl butyral film.

According to a further embodiment, the vacuum insulated glass has a barrier, in particular a barrier made of silicone, which is arranged between the cavity and the vacuum sealant.

According to a further embodiment, the vacuum insulated glass has spacers made of plastic, preferably transparent plastic, which are arranged in a distribution in the cavity.

According to a further embodiment, the spacers preferably have a diameter of from 3 mm to 12 mm, preferably from 7 to 10 mm. The spacers may have a height of 0.5 mm to 3 mm, preferably 1 mm to 2 mm.

According to another embodiment, the present disclosure relates to a method of manufacturing vacuum insulation elements, the method comprising:
  Applying a vacuum sealant to a first surface of a first sheet member, the vacuum sealant comprising a plastic film having a preferably rough surface;

placing a second sheet member on the vacuum sealant such that a cavity is formed between the first and second sheet members and the vacuum sealant;

Applying a vacuum to an outside surface of the vacuum sealant until a vacuum is established in the cavity;

heating of the vacuum sealant.

In the following, embodiments of the method according to the invention and of the vacuum insulated glass according to the invention are explained in more detail with reference to the accompanying drawings.

Referring to FIG. 1, there is shown a schematic flow chart of a method of manufacturing vacuum insulated glass in accordance with one embodiment of the present invention. The method 100 comprises a first step 102 of applying vacuum sealant to a first glass sheet.

The vacuum sealant is a plastic film, which preferably has a rough surface. In an exemplary embodiment, the plastic film is a polyvinyl butyral film. The vacuum sealant, which is in the form of a plastic film, can be deposited or applied in sheets or strips on the edge of a first surface of the first pane of glass. The strips of plastic film can have a width of 5 mm to 15 mm. The strips are deposited along the edge of the first glass pane in such a way that they have as straight as possible abutting edges where two adjacent strips meet. In the case of a rectangular glass pane, for example, four plastic strips (e.g. made of PVB) can be placed on the glass pane. One strip is placed next to each along the edges of the first pane of glass and connected to the glass pane, at least provisionally.

Before or after applying the vacuum sealant, a barrier can additionally be applied to the first surface of the first glass sheet. This barrier is formed, for example, from a silicone, preferably a transparent silicone, or acrylic strip. The barrier is applied to an inner surface of the vacuum sealant. In other words, the barrier is located on the side of the vacuum sealant opposite the outer edge of the glass pane. As will be explained in more detail below, the barrier can accordingly be used to prevent the vacuum sealant from flowing into a vacuum cavity during heating.

Optionally, spacers can also be applied to the first surface of the first glass sheet. These can be arranged before or after the application of the vacuum sealant or before or after the application of the barrier on the first surface of the first glass pane. In particular, the spacers are arranged within the vacuum sealant and, if a barrier is used, also within the barrier and serve to define the height of the vacuum cavity and to space the two glass sheets.

FIG. 1 further shows a second step 104, in which a second glass sheet is placed with its first surface on the vacuum sealant. This forms a cavity between the first surfaces of the first and second glass sheets, which is surrounded/bounded by the vacuum sealant. In other words, the two glass sheets together with the vacuum sealant span a cavity. Provided that spacers or a barrier were applied to the first surface of the first glass sheet in the first step 102, these are also accommodated between the two first surfaces of the glass sheets, as a result of which the cavity is located in particular within the barrier. The barrier thus separates the cavity from the vacuum sealant.

The two glass panes each have a second surface, which is opposite the first surface. According to a further embodiment, further glass panes or other surface elements or layers can be attached to the rear side (i.e., the second surface of the first and/or second glass pane). For example, the first and/or the second glass pane may be connected to another glass pane on its second surface via a composite film. The composite film may, for example, be made of PVB. According to this embodiment of the method, not only a vacuum cavity between the first and second glass sheets can be achieved very easily. Rather, the first and/or the second glass pane can also be simultaneously formed as laminated safety glass (LSG).

In a third step 106, a vacuum is applied to the outside of the preassembly comprising the first and second glass sheets (and possibly further sheet elements or glass sheets). According to one embodiment, the preassembly of the glass sheets and area elements can be placed in a vacuum bag, which is connected to a vacuum pump. The vacuum pump can draw air and other gases from the interior of the vacuum bag, and thus from the cavity between the first glass sheet and the second glass sheet. In doing so, the vacuum bag will conform to the outer surfaces of the first and second glass sheets, removing air or gases present in the cavity due to the bonding of the two glass sheets from the latter.

The air can escape from the cavity via the vacuum sealant, which is in the form of a plastic film. This is only the case until the vacuum sealant heats up, which then hermetically seals the cavity. Accordingly, the vacuum is applied to the outside of the glass panes for a minimum time of 30 minutes to 60 minutes so that the cavity becomes an airless space before the vacuum sealant is heated in step 108.

The vacuum sealant is heated in step 108 in an autoclave, for example. In particular, the vacuum bag can be introduced into the autoclave together with the glass panes, the vacuum pump preferably being arranged outside the autoclave and connected to the vacuum bag. After a sufficiently air-free space has been achieved in the cavity between the glass sheets, the glass pre-composite with the vacuum sealant is heated. In particular, this can be heated to a temperature of 100° C. to 150° C., preferably between 125° C. and 135° C. This activates the vacuum sealant, which is in the form of a plastic film, and bonds it in a sealing manner to the first surfaces of the two glass sheets.

According to another embodiment, while the vacuum sealant is heated, an overpressure is also generated in the autoclave, which presses the two glass sheets towards each other and thus towards the vacuum sealant. The overpressure generated in the autoclave cannot cause the cavity to be filled with air again, since the glass sheets continue to be connected to the vacuum pump in the vacuum bag. Accordingly, the overpressure acts exclusively on the outside of the vacuum bag. The pressure applied here can be selected from bar (30 kPa) to 3 bar (300 kPa), preferably 1 bar to 2 bar (100 kPa to 200 kPa). In some embodiments, however, no overpressure is used to produce the vacuum insulated glass.

Figure 2:
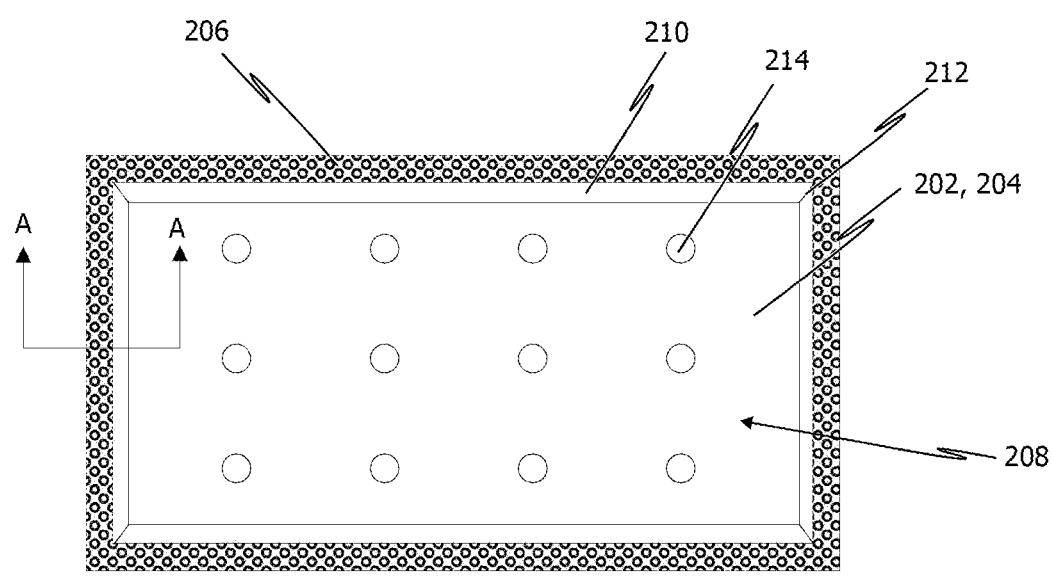
FIG. 2 is a schematic top view of a vacuum insulated glass according to an embodiment of the present invention.

FIG. 2 shows a schematic top view of a vacuum insulated glass according to one embodiment of the present invention. The vacuum insulated glass 200 according to FIG. 2 has a first glass sheet 202 and a second glass sheet 204, which are arranged parallel to each other. The two glass panes 202, 204 are connected to each other via a vacuum sealant 206. The vacuum sealant 206 is attached along the edges of the glass panes 202, 204. As can be seen, the vacuum sealant 206 forms an encompassing frame that delimits an edge of a cavity 208 between the two glass panes 202, 204. After going through a process according to FIG. 1, the vacuum sealant 206 is hermetically sealed to the two glass panes 202, 204 so that no air or other gases can enter the cavity 208 from the outside.

A barrier 210 is disposed internally adjacent the vacuum sealant 206. The vacuum barrier 210 shown in FIG. 2 is exemplarily formed of four silicone strips, each of which is mitered at its opposite ends. Accordingly, a miter joint 212 is provided at each abutting edge between two adjacent silicone strips of the barrier 210. In particular, the four miter joints 212 serve to evacuate the air/gas from the cavity 208 in step 106.

The provision of the barrier 210 also prevents the flowable plastic film of the vacuum sealant 206 from running uncontrollably toward the cavity 208 during heating. In other words, an accurate, repeatable sealing frame of the vacuum sealant 206 is achieved by the barrier 210.

As indicated above, a plurality of spacers 214 may be disposed between the two glass sheets 202, 204. In particular, the spacers 214 may be formed of transparent plastic so that the vacuum insulated glass 200 is fully transparent. At this point, it should also be mentioned that both the vacuum sealant formed from PVB and the silicone barrier are transparent after heating and can only be seen between the panes by those skilled in the art.

The spacers 214 may have a diameter of 3 mm to 12 mm, preferably 7 mm to 10 mm. This diameter is significantly larger than is the case with spacers of conventional vacuum insulated glasses. Accordingly, the spacers may be spaced further apart so that the number of spacers 214 may be reduced, thereby also improving the transparency of the vacuum insulated glass.

The spacers can have a height of 0.5 mm to 3 mm, preferably 1 mm to 2 mm. This also defines the thickness of the cavity (i.e., the distance between the two glass sheets 202, 204). The height of 1 mm to 10 mm results in a larger distance between the two glass sheets 202, 204 than is the case with known vacuum insulated glasses, which further reduces the heat transfer coefficient.

Figure 3:
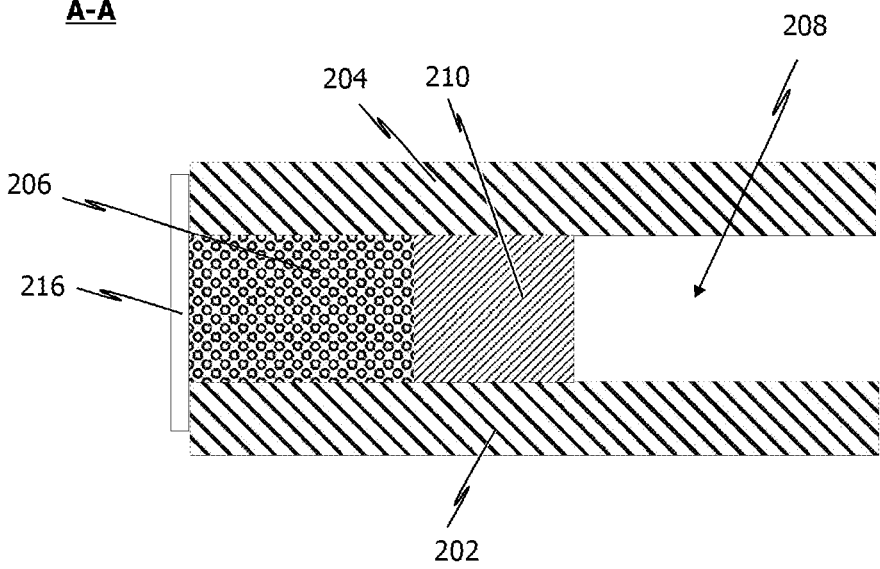
FIG. 3 is a cross-section through the vacuum insulated glass shown in FIG. 2 along axis A-A.

Referring to FIG. 3, a cross-sectional view of the vacuum insulated glass 200 of FIG. 2 is shown along the sectional axis A-A. In particular, an additional edge cover 216 is shown, which is arranged at the side edges of the first and second glass panes 202, 204. The edge cover 216 serves to close off the gap between the two glass panes 202, 204 along the side edge. Thus, the edge cover 216 ensures that the vacuum sealant 206 formed from a plastic film cannot flow out of the gap between the two glass panes 202, 204 during heating. Accordingly, the vacuum sealant distributes in the space between the edge cover 216 and the barrier 210 and hermetically seals the space, so that the vacuum formed in the cavity 208 can be maintained for a long period of time. For example, the edge cover 216 may be formed from a metal foil, such as an aluminum foil, stainless steel foil, or titanium foil.

It will be understood that the embodiments described hereinabove are merely exemplary and that a person skilled in the art may make many variations and modifications without departing from the spirit and scope of the present invention. The present invention is not limited to the embodiments shown in the figures, but results from a combination of all of the features disclosed herein. Also, it should be noted that the invention can be applied not only to vacuum insulated glass, but to any other vacuum insulating element in which a cavity is disposed not between sheets of glass, but between two other transparent or opaque surface elements. All such variations and modifications are intended to be included within the scope of the present invention.

What is claimed is:

1. A method of manufacturing vacuum insulated glass, the method comprising:
   applying a vacuum sealant to a first surface of a first glass sheet, wherein the vacuum sealant comprises a plastic film;
   placing a second glass sheet on the vacuum sealant such that a cavity is formed between the first and second glass sheets and the vacuum sealant;
   applying a vacuum to an outer surface of the vacuum sealant until a vacuum is established in the cavity, wherein the first and second glass sheets are placed in a vacuum bag to apply the vacuum;
   heating the vacuum sealant while the first and second glass sheets are in the vacuum bag;
   applying a barrier prior to placing the second glass sheet, the barrier being disposed between the cavity and the vacuum sealant; and
   wherein the barrier comprises at least two mitered portions that are juxtaposed on the first surface of the first glass sheet such that a miter joint is formed.

2. A method of manufacturing vacuum insulated glass, the method comprising:
   applying a vacuum sealant to a first surface of a first glass sheet, wherein the vacuum sealant comprises a plastic film;
   placing a second glass sheet on the vacuum sealant such that a cavity is formed between the first and second glass sheets and the vacuum sealant;
   applying a vacuum to an outer surface of the vacuum sealant until a vacuum is established in the cavity, wherein the first and second glass sheets are placed in a vacuum bag to apply the vacuum;
   heating the vacuum sealant while the first and second glass sheets are in the vacuum bag;
   applying a barrier prior to placing the second glass sheet, the barrier being disposed between the cavity and the vacuum sealant; and
   wherein the barrier comprises at least two strips which are spaced apart from each other at their abutting edges by 0.5 mm to 2 mm.

3. The method of claim 1 or 2, wherein the vacuum sealant comprises a polyvinyl butyral film having a rough surface.

4. The method of claim 1 or 2, wherein the barrier is formed from a material selected from a group consisting of silicone and acrylic strip.

5. The method of claim 4, wherein said silicone comprises transparent silicone.

6. The method of claim 1 or 2, wherein the first and second glass sheets are placed in an autoclave for heating the vacuum sealant.

7. The method of claim 6, wherein a pressure of from 0.5 bar to 3 bar is applied in the autoclave during heating of the first and second glass sheets.

8. The method of claim 6, wherein a pressure of from 1 bar to 2 bar is applied in the autoclave during heating of the first and second glass sheets.

9. The method of claim 1 or 2, wherein the vacuum sealant is heated to between 100° C. and 150° C.

10. The method of claim 1 or 2, wherein the vacuum sealant is heated to between 125° C. and 135° C.

11. The method of claim 1 or 2, wherein before the second glass sheet is placed, spacers made of plastic are distributed on the first surface of the first glass sheet in such a way that the spacers are arranged in the cavity after the second glass sheet is placed.

12. The method of claim 1 or 2, wherein before the second glass sheet is placed, spacers made of transparent plastic are distributed on the first surface of the first glass sheet in such a way that the spacers are arranged in the cavity after the second glass sheet is placed, the spacers having a diameter of 7 mm to 10 mm.

13. The method of claim 1 or 2, wherein the method further comprises a step of applying an edge cover to side edges of the first and second glass sheets, prior to heating the vacuum sealant.

14. The method of claim 1 or 2, further comprising the step of forming the first glass sheet and/or the second glass sheet as laminated safety glass, and wherein the temperatures used in the heating step are sufficiently low to thereby produce vacuum insulated glass made of laminated safety glass.

\* \* \* \* \*